(12) United States Patent
Pappu et al.

(10) Patent No.: US 8,116,229 B2
(45) Date of Patent: Feb. 14, 2012

(54) REDUCING PACKET DROPS IN NETWORKS GUARANTEEING IN-ORDER DELIVERY

(75) Inventors: Prashanth Pappu, San Francisco, CA (US); Ronak Desai, Fremont, CA (US); Ankur Goyal, San Jose, CA (US); Tejas Kokje, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 264 days.

(21) Appl. No.: 12/033,874

(22) Filed: Feb. 19, 2008

(65) Prior Publication Data

US 2009/0207737 A1    Aug. 20, 2009

(51) Int. Cl.
*H04L 12/28*      (2006.01)

(52) U.S. Cl. ...................................................... 370/254
(58) Field of Classification Search ................... 370/254
See application file for complete search history.

(56) References Cited

U.S. PATENT DOCUMENTS

| | | | |
|---|---|---|---|
| 2002/0150039 A1* | 10/2002 | Valdevit | 370/216 |
| 2006/0153186 A1* | 7/2006 | Bector et al. | 370/389 |
| 2009/0168768 A1* | 7/2009 | Chiabaut et al. | 370/389 |

* cited by examiner

*Primary Examiner* — Kevin C Harper
(74) *Attorney, Agent, or Firm* — Charles E. Krueger (57) ABSTRACT

In one embodiment, the convergence node switches of a destination node switch in a network having multiple equal paths between a source switch and destination switch are identified. When a new equal cost path is added to the network, packets are flushed up to the convergence node switch closest to the source switch.

20 Claims, 5 Drawing Sheets

Pseudocode for modified Dijkstra function cDijkstra (G, w, s)

/* *initialization* */ for each vertex v in V(G)
        d[v] := infinity        /* *distance to vertex v from s* */
        nh[v] := infinity       /* *max number of hops to vertex v from s* */
        cv[v] := {}            /* *convergence vertices set of v* */
        mp[v] := {}           /* *multi-path set to reach v* */
    end for d[s] := 0
    nh[s] := 0
    cv[s] := {}
    S := {}
    Q := V[G]

/* *main loop* */
    while (Q != {})
        u := extract_min(Q)
        S := S union {u}

/* *relaxing new vertices*
        for each edge (u,v) outgoing from u
            if ( d[u] + w(u,v) < d[v])

/* *update distance and max number of hops to v* */
                d[v] := d[u] + w[u,v]
                nh[v] := nh[u] + 1;

/* *update convergence set of v from s* */
                cv[v] := cv[u] union {v}

/* *update multi-path set to reach v* */
                if (u =s)
                      mp[v] := {(v,s)}
                else
                      mp[v] := mp[u]
                end if
            end if if ( d[u] + w(u,v) = d[v]

/* *newer ECMP* */

/* *update distance and max number of hops to v* */
                nh[v] := max(nh[v], nh[u] + 1

/* *update convergence set of v from s* */
                cv[v] := cv[v] intersection ('cv[u] union {v} )

/* *update multi-path set to reach v* */
                if (u +s)
                      mp[v] := mp[v] union {v,s}
                else
                      mp[v] = mp[v] union mp[u]
                end if
            end if
        end for
    end while
end function

REDUCING PACKET DROPS IN NETWORKS GUARANTEEING IN-ORDER DELIVERY

BACKGROUND OF THE INVENTION

A data network is said to guarantee In-Order Delivery (IOD) if the packets sent by a source host are received in the same order at the destination host.

Most data networks are not required to guarantee in-order delivery. For example, in IP networks, the packets sent by a source host can be received out of order at a destination host. Such networks typically employ a higher layer protocol like Transmission Control Protocol (which uses a re-sequencing buffer at the destination host), to guarantee in-order delivery of packets to the host applications.

However, there are some networks (primarily Layer 2 (L2) networks) that are required to guarantee In-Order Delivery (IOD). Fibre Channel (FC) is an example of such an L2 network. Some FC capable end host devices expect the FC network to deliver packets in order. Out-of-order delivery of packets to such hosts can result in catastrophic failures. With Input/Output (IO) consolidation, newer L2 networks like Data Centre Ethernet (DCE) also need to guarantee IOD. Hence, IOD is a very important feature of new L2 networks.

TECHNICAL FIELD

The present disclosure relates generally to reducing the number of packet drops in a network guaranteeing in-order delivery due to the addition of a new equal cost path between a source and a destination.

DESCRIPTION OF EXAMPLE EMBODIMENTS

OVERVIEW

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase "an example embodiment" at various places in the specification does not necessarily refer to the same example embodiment.

One example embodiment is a method that identifies a set of convergence node switches of a destination switch in a network including an interconnected group of switches when a new equal cost path is added to the network between a source switch and the destination switch, with the network having a plurality of equal cost paths connecting the source switch and the destination switch, where the set of convergence node switches includes those switches which are common to all equal cost paths between the source switch and the destination switch.

In the following, the term switch is utilized broadly to include any network device such as a router, bridge, switch, layer 2 or layer 3 switch, gateway, etc., that is utilized to implement connectivity within a network or between networks.

The number of hops between the source switch and each convergence node switch is calculated and packets are dropped at the source switch for a selected time interval when the new equal cost path is added, where the time interval has a value equal to the sum of switch lifetimes of the packet for each switch disposed up to the convergence node switch having the least number of hops from the source switch.

DESCRIPTION

Figure 1:
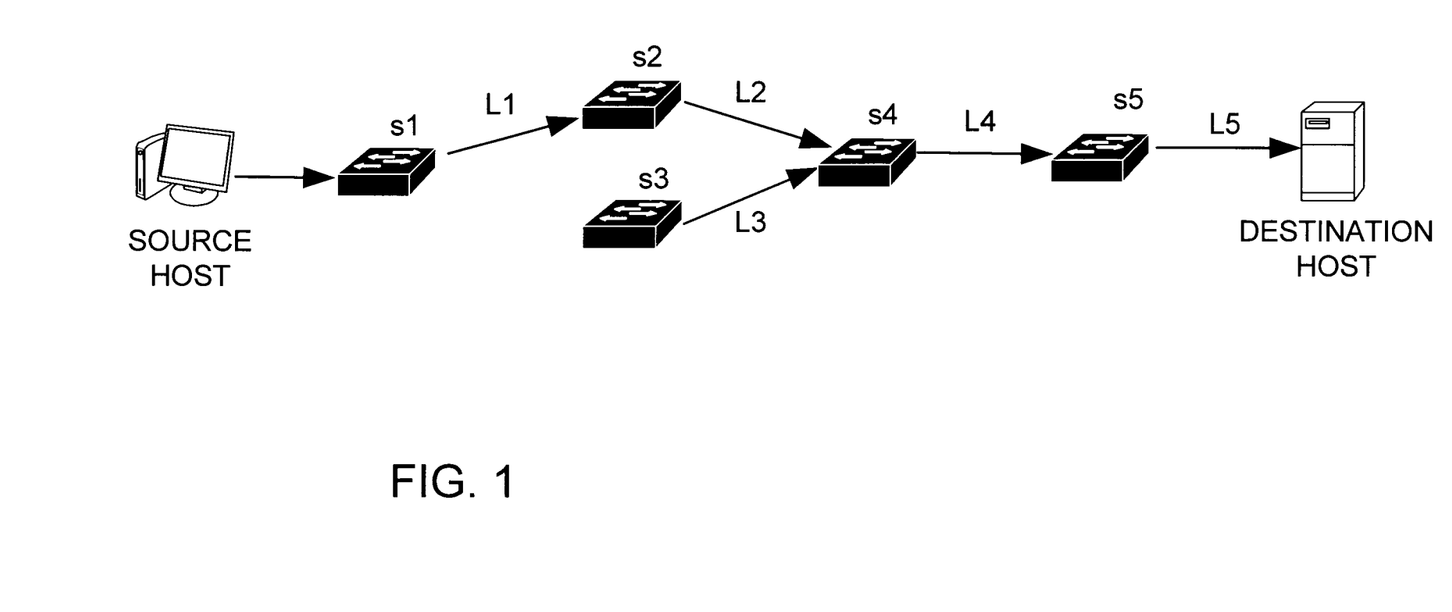
FIG. 1 illustrates an example of network topology with only a single path between source and destination switches.
Figure 2:
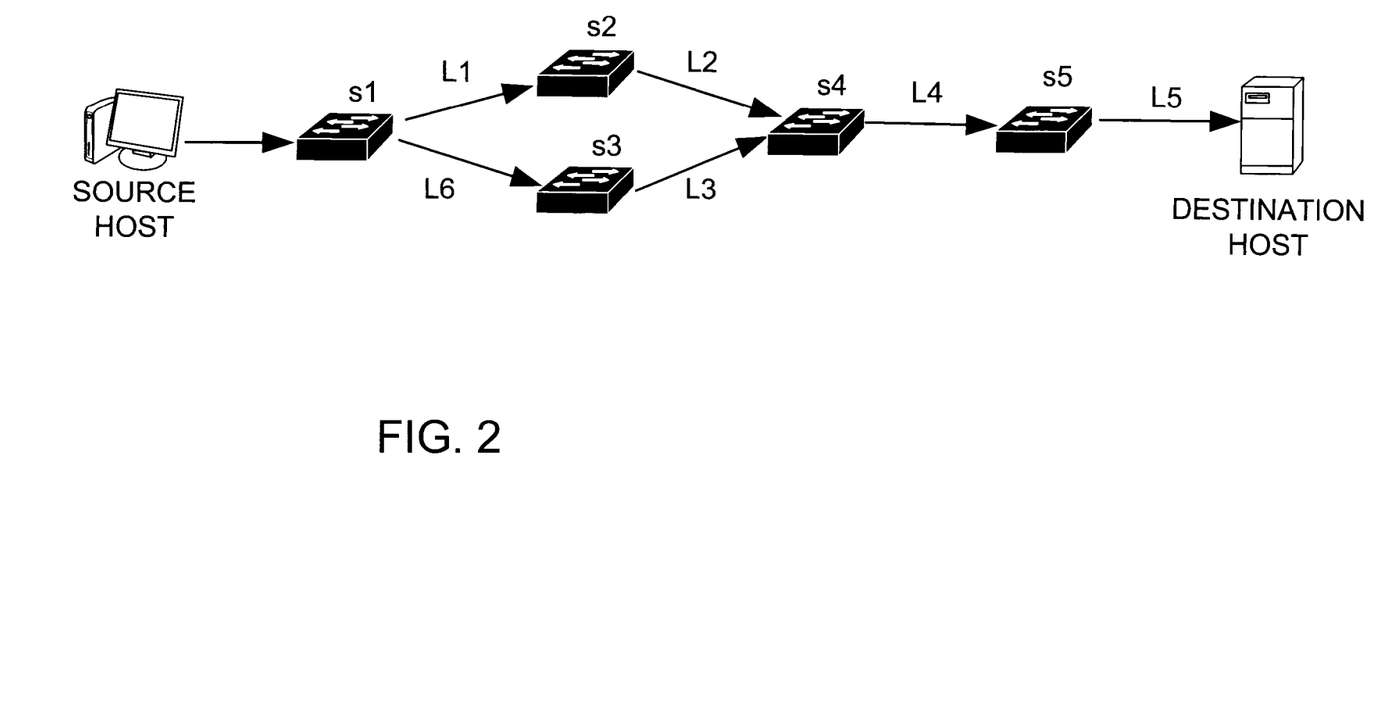
FIG. 2 illustrates the example network topology of FIG. 1 with a new link added and having two equal cost paths between source and destination.

FIG. 1 depicts an example network having five switches, s1 (source switch), . . . s5 (destination switch) and two hosts (source host and destination hosts). Links between switches will be referred to by utilizing two equivalent descriptions. For example, in FIG. 1 the link between s1 and s2 is labeled L1. Alternatively, the same link can be referred to by the tuple (s1,s2) which sets forth the end points of the link. In FIG. 2 there are first and second equal cost paths, {L1,L2,L4,L5} and {L6,L3,L4,L5} respectively, between the source and the destination hosts. The cost of a path is determined by a metric assigned to each link in the path by a routing protocol. It is assumed that all links in this network have the same value for link cost.

Out-of-Order Delivery (OOO) can occur when there are multiple paths between a source and a destination. Equal Cost Multi-Paths (ECMP) between a source and a destination are commonly built using link state routing protocols like Fabric Shortest Path First (FSPF) in FC networks and Intermediate System-Intermediate System Protocol (IS-IS) in DCE networks. Most switches in an L2 network do not, by themselves, cause packets of a flow to be transmitted out of order. Hence, in steady state, when there are no network topology changes, most L2 networks do guarantee IOD of packets of various flows. This is because the switches use flow based hashing to map individual flows to unique paths between source and destination. Hence, though there are multiple paths between source and destination, a given flow uses only one path and IOD is guaranteed for all packets within a flow. For example, in the topology example of FIG. 2, at s1 the cost to reach the destination is the same whether a packet is sent on L1 or L6. However, for a particular flow, a hash algorithm executed on s1 hashes designated fields in each packet and selects an outgoing link based on the hashed value. Thus, for a given flow all packets will be directed to the same outgoing link, e.g., L1, and IOD is assured during the steady state.

But IOD is not guaranteed during network topology changes. This condition will now be described in more detail with reference to FIG. 2. FIG. 2 depicts the same network topology as FIG. 1 except that a new link, L6, is added between s1 and s3. This leads to the formation of two equal cost paths between the source and destination hosts denoted by: ECP1={L1,L2,L4,L5}, ECP2={L6,L3,L4,L5}.

The possible out-of-order condition can be illustrated by considering two packets, p1, p2, in the same flow where p1 is prior to p2 in the flow. Assume that p1 is transmitted when the topology is as depicted in FIG. 1 so that it will be forwarded to s2 over link L1 and to s4 over link L2. Also, assume that p2 is transmitted after the network is reconfigured to the topology as depicted in FIG. 2 and that p2 is rehashed to be forwarded to s3 on link L6 and to s4 over link L3.

As will now be described with reference to FIG. 3, it is possible for p2 to arrive at s4 before p1 arrives at s4 so that the packets are delivered out of order.

First, every switch has a defined maximum switch lifetime (typically 500 ms) for each packet. A packet that is queued in a switch for more than the switch lifetime is simply dropped. Similarly, the maximum network lifetime of a packet is D×(maximum switch lifetime) where D is the maximum number of switches between any source and destination. In other words, D is the network diameter. For example, in FIG. 2, D=4. Hence, a packet cannot be in the network for a time greater than the maximum network lifetime equal to about 2.0 seconds.

Figure 3:
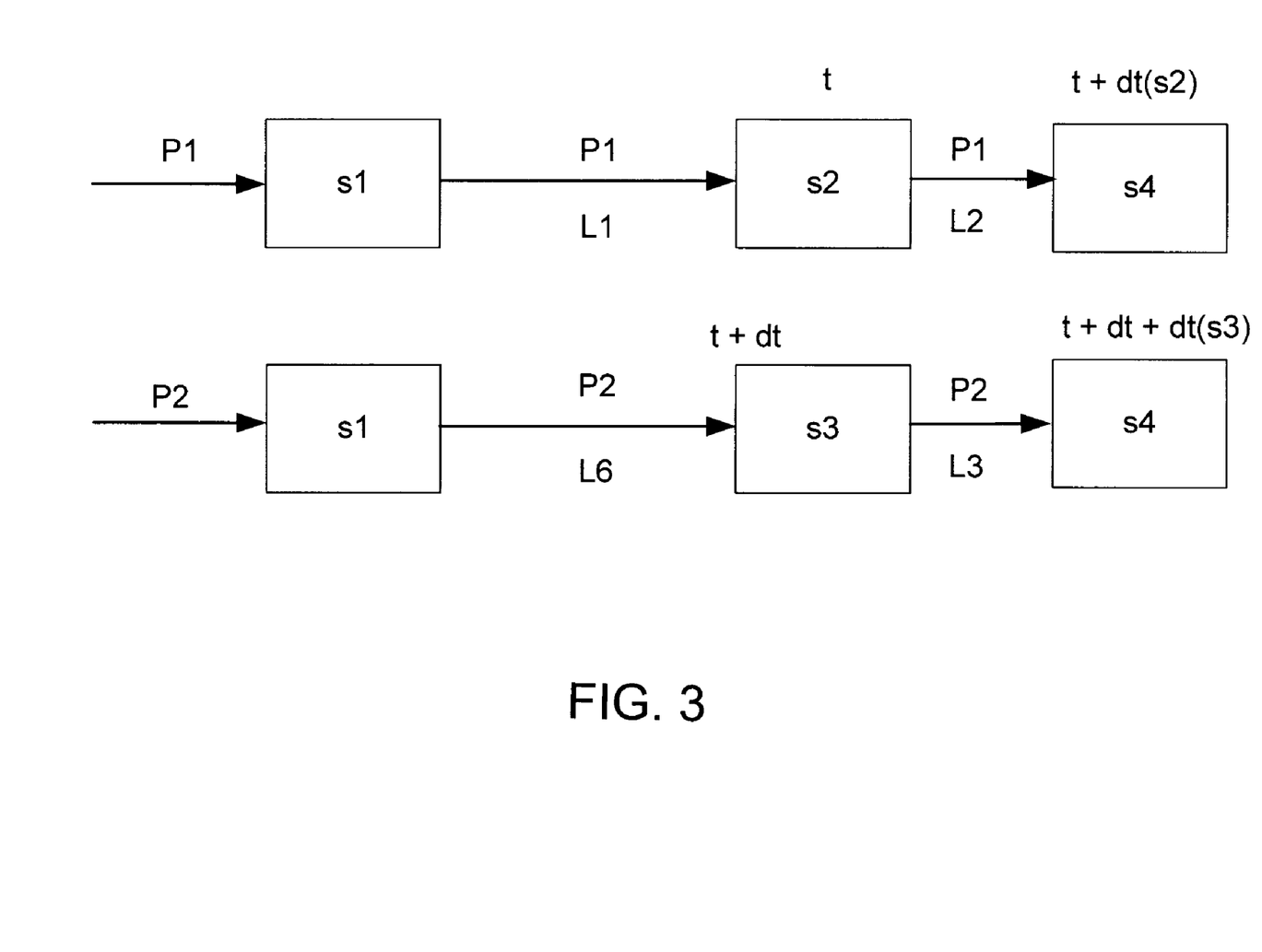
FIG. 3 illustrates an example where the addition of a new equal cost path could cause out-of-order packet delivery.

In FIG. 3 p1 is transmitted from s1 at time t and p2 is transmitted from 1 at time t+dt so the packets are transmitted from s1 in order. In the following it is assumed transmission over the links is instantaneous and that delays are caused due to queuing at the switches. The delay at s2 is dt(s2) and the delay at s3 is dt(s3). Accordingly, as depicted in FIG. 3, p1 arrives at s4 at time t+dt(s2) and p2 arrives at s4 at time t+dt+dt(s3). If dt(s2) is greater than (dt+dt(s3)) then p2 will arrive at s4 before p1 and the packets in the flow will be out of order.

Packets in the flow subsequent to p2 will be transmitted on the same path. The simple solution essentially drops traffic at s1 for the maximum network lifetime before making the change in the set of equal cost multi-paths (ECMP) to the destination during network topology changes. This ensures that all "old packets" carried on older sets of ECMPs are 'flushed' out of the network before newer packets are carried on the newer set of ECMPs.

For example, when a new link, e.g., L6, is added to the topology depicted in FIG. 1 (as depicted in FIG. 2) s1 will drop all packets arriving in the next 2.0 seconds. This simple solution causes a large number of packet drops for every route change for a duration of D×500 ms. While D is typically only 4 in FC networks, it is expected to be much higher in DCE networks. Dropping of such a high number of packets can cause problems like unnecessary network resource usage due to packet retransmissions and increased latency.

An example of an embodiment that flushes packets only up to a first convergence node instead of for the entire network will now be described. The set of convergence nodes of a destination includes the nodes (switches) that are common to all equal cost multi-paths (ECMPs) from the source. For example, in FIG. 2 the convergence nodes for the destination from s1 are s4 and s5.

In the topology depicted in FIG. 2, packets have to be flushed only up to s4, the convergence node closest to the switch where the new link is added (in this case s1). This is because once packets in the flow arrive at s4 (the first convergence node) the later packets cannot overtake the earlier packets. So packets are dropped at s1 until previously transmitted packets in the flow have arrived at s4. From s4, packets take the same path as before and cannot overtake each other. The time period for dropping packets is only the maximum switch lifetime of s1 plus either s2 or s3 instead of the sum of the maximum switch lifetimes for all switches between the source and destination. Accordingly, in the example topology of FIG. 2 the time period of dropping packets is reduced from 2.0 seconds to 1.0 second.

In an example embodiment a modification of the Dijkstra Shortest Path First (SPF) algorithm, E. W. Dijkstra. "*A Note on Two Problems in Connexion with Graphs.*" Numerische Mathematik, Vol. 1, 1959, pp. 269-271, is utilized to calculate the set of convergence nodes. For each destination this modified algorithm gives: 1) the set of next hops (for the various equal cost paths); 2) the set of convergence nodes; and 3) the convergence node that is closest to the source (as determined by the number of hops).

Figure 4:
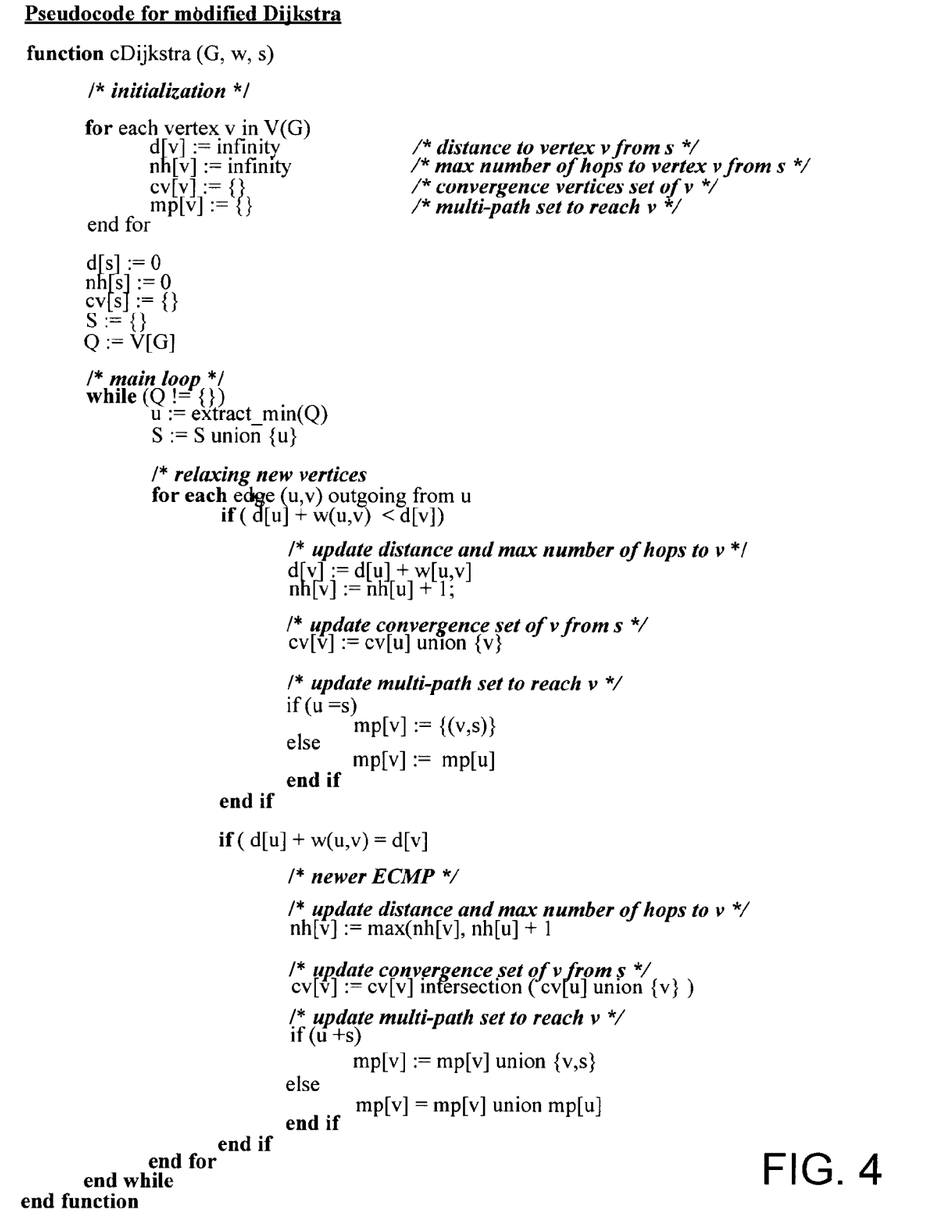
FIG. 4 illustrates pseudocode of an example procedure for determining the convergence nodes of a destination node in a network topology.

Pseudocode for the modified Dijkstra algorithm is depicted in FIG. 4. An example calculation will now be presented for switch s1 for the topology depicted in FIG. 2. In this example the graph (G) includes vertices (v) which are switches s1-s5 and the weights (w) for links L1, L6, L2, L3, L4, and L5 are equal to 1.

Q is initialized with all the vertices (switches) in the graph (network) and the while loop is executed until Q is equal to the empty set. The first vertex extracted is u=s1 and the edges (links) are (s1,s2) and (s1,s3), or equivalently, L1 and L6. The first if statement is true because d[s2] and d[s3] are initialized to infinity. Therefore for edge (s1,s2): v=s2; d[s2]=1; nh[s2]=1; cv[s2]={s2}; and mp[s2]={L1}. For edge (s1,s3): v=s3; d[s3]=1; nh[s3]=1, cv[s3]={s3}; and mp[s3]={L6}.

Next the second vertex extracted is u=s2 and the edge (link) is (s2,s4), or equivalently, L2. The first if statement is true because d[s4] is initialized to infinity. Therefore for edge (s2, s4): v=s4; d[s4]=2; nh[s4]=2; cv[s4]={s2,s4}; and mp[s4]= {L1}. After this, edge (s2, s1) or link L1 is selected. But since both the if conditions fail, this link is ignored.

Next the third vertex extracted is u=s3 and the edge (link) is (s3,s4), or equivalently, L3. The first if statement is not true because d[s4]=2. The second if statement is true indicating the existence of two equal cost paths to s4. For edge (s3, s4): v=s4; d[s4]=2; nh[s4]=2; cv[s4]:=cv[s4] intersection (cv[s3] union {v})={s2,s4} intersection ({s3} union {s4})={s2,s4} intersection {s3,s4}={s4}; and mp[s4]=mp[s4] union mp[s3]={L1} union {L8}={L1,L6}. After this, edge (s3, s1) or link L6 is selected. But since both if conditions fail, this link is ignored.

Accordingly, the modified algorithm has computed the identity of the first entry in the set of convergence nodes, i.e., s4, the multiple-path set to reach s4, i.e., {L1, L6}, and the number of hops to the convergence node, i.e., 2.

Next the fourth vertex extracted is u=s4 and the edge (link) is (s4,s5) or equivalently, L4. The first if statement is true because d[s5] is initialized to infinity. Therefore for edge (s4, s5): v=s5; d[s5]=3; nh[s5]=3; cv[s5]={s4, s5}; and mp[s5]= {L1, L6}. After this, edge (s4, s2) or link L2 is selected. But since both if conditions fail, this link is ignored. Similarly, link L3 or (s4,s3) is also ignored since it fails both if conditions.

Next the fifth vertex u=s5 is extracted and the edge (link) (s5,s4) or equivalently, L4 is selected. However, since both if conditions fail for this link, it is ignored.

At this point the algorithm has processed all the vertices and has computed convergence nodes towards the destination switch (cv[s5]={s4, s5}). Since, from s1 to destination, the number of hops towards convergence node s4 (nh[s4]=2) is less than number of hops towards convergence node s5 (nh [s5]=3), s4 is the closest convergence node. Hence packets will be dropped at node s1 for time 500 ms×(nh[s4])=500 ms×(2)=1000 ms=1.0 second.

Figure 5:
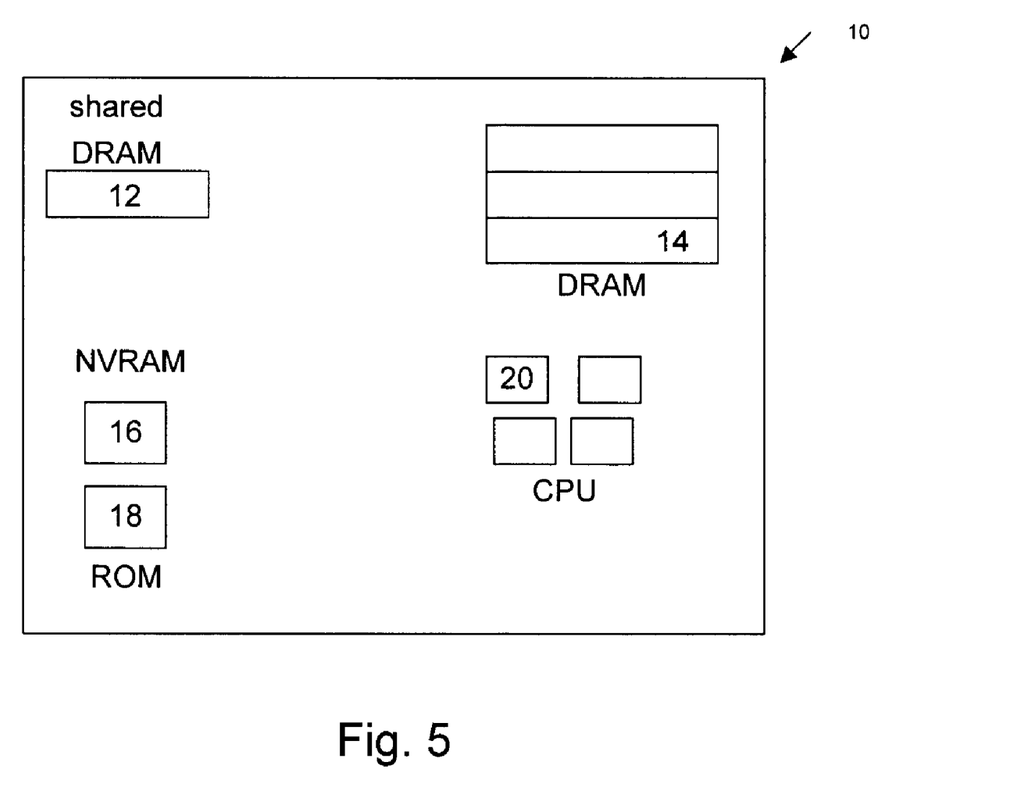
FIG. 5 illustrates an example of a network device.

FIG. 5 depicts an example of a network device including a motherboard 10 having shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the network device's packet buffer. The NVRAM (non-volatile RAM) is used to store the network device's configuration file and also includes flash memory for storing an image of the Operating System. The ROM 18 holds a boot-start program which holds a minimum configuration state needed to start the network device. Alternatively, other configurations of the motherboard can be used. For example, the motherboard may not have separate ROM or NVRAM and the configuration file and operating system image may be stored and executed out of flash memory.

In an example embodiment, software for implementing the modified Dijkstra SPF algorithm is included as a part of the operating system stored in memory and is executed by the CPU 20. Alternatively, parts of the algorithm could be implemented as hard-wired logic.

The invention has now been described with reference to the example embodiments. Alternatives and substitutions will now be apparent to persons of skill in the art. Accordingly, it is not intended to limit the invention except as provided by the appended claims.

What is claimed is:

1. A method comprising:
   identifying, using a processor, at least first and second convergence node network devices in a network including an interconnected group of network device when a new link is added to the network between first and second selected network devices in the interconnected group of network devices to form a new network topology with the new network topology having a plurality of equal cost paths connecting a source network device and a destination network device, where the first and second convergence node network devices are network devices which are common to all equal cost paths in the new network topology coupling the source network device and the destination network device and where the first and second convergence node network device are located between the source and destination devices and do not include the source and destination network devices;
   identifying, using the processor, which of the first and second convergence node network devices is a critical convergence node network device which is closest to the second selected network device and positioned between the second selected network device and the destination network device and where the destination device is not a convergence node; and
   flushing packets from the network only up to the critical convergence node network device when the new link is added to the network.

2. The method of claim 1 wherein flushing comprises:
   dropping packets at the source network device for a selected time interval when the new link is added, where the time interval has a value equal to the sum of network device lifetimes for each network device, including the source network device, positioned between the source network device and the critical convergence node network device.

3. The method of claim 1 wherein identifying comprises:
   calculating the number of hops between each convergence node network device positioned between the second selected network device and the destination network device, where the critical convergence node network device is the convergence node network device having the least number of hops from the second selected network device.

4. The method of claim 3 wherein identifying and identifying comprises:
   performing a modified shortest path first algorithm.

5. The method of claim 4 further comprising:
   including all network devices in the network as vertices.

6. A method comprising:
   identifying a set of convergence node network devices in a network including an interconnected group of network devices when a new link is added to the network between first and second selected network devices in the interconnected group of network devices to form a new network topology, with the new network topology having a plurality of equal cost paths connecting the source network device and the destination network device, where the set of convergence node network devices includes those network devices which in the new network topology are common to all equal cost paths between the source network device and the destination network device, where identifying comprises;
   performing a modified shortest path first algorithm including all network devices in the network as vertices;
   for a next hop network device connected to a selected network device by a next hop link, where the next hop network device is closer to the destination network device than the selected network device:
   calculating a current test set of convergence nodes equal to the union of the test set of convergence node network devices for the selected network device and a next hop set including only the next hop network device if the path from the source network device to the next hop network device that includes the selected network device is the first equal cost path from the source network device to the selected next hop network device; or
   calculating a current test set of convergence nodes equal to the intersection of a previous test set of convergence nodes calculated for the next hop network device and the union of the test set of convergence nodes for the selected network device and a next hop set including only the next hop network device if the path from the source network device to the next hop network device that includes the selected network device is not the first equal cost path from the source network device to the next hop network device;
   identifying a critical convergence node network device which is closest to the second selected network device and positioned between the second selected network device and the destination network device by calculating the number of hops between each convergence node network device positioned between the second selected network device and the destination network device, where the critical convergence node network device is the convergence node network device having the least number of hops from the second selected network device; and
   flushing packets from the network only up to the critical convergence node when the new link is added to the network.

7. The method of claim 4 wherein determining the number of hops to each convergence node network device comprises:
   for a next hop network device connected to a selected network device by a next hop link, where the next hop network device is closer to the destination network device than the selected network device:

setting the number of hops equal to the maximum of either the number of hops of the selected network device incremented by one or a previously calculated number of hops to the next hop network device.

8. An apparatus comprising:

means for identifying at least first and second convergence node network devices in a network including an interconnected group of network device when a new link is added to the network between first and second selected network devices in the interconnected group of network devices to form a new network topology with the new network topology having a plurality of equal cost paths connecting a source network device and a destination network device, where the first and second convergence node network devices are network devices which are common to all equal cost paths in the new network topology coupling the source network device and the destination network device and where the first and second convergence node network device are located between the source and destination devices and do not include the source and destination network devices;

means for identifying which of the first and second convergence node network devices is a critical convergence node network device which is closest to the second selected network device and positioned between the second selected network device and the destination network device and where the destination device is not convergence node; and means for flushing packets from the network only up to the critical convergence node network device when the new link is added to the network.

9. The apparatus of claim 8 wherein said means for flushing comprises:

means for dropping packets at the source network device for a selected time interval when the new link is added, where the time interval has a value equal to the sum of network device lifetimes for each network device, including the source network device, positioned between the source network device and the critical convergence node network device.

10. The apparatus of claim 8 wherein said means for identifying comprises:

means for calculating the number of hops between each convergence node network device positioned between the second selected network device and the destination network device, where the critical convergence node network device is the convergence node network device having the least number of hops from the second selected network device.

11. The apparatus of claim 10 wherein said means for identifying and said means for calculating comprises:

means for performing a modified shortest path first algorithm.

12. The apparatus of claim 10 further comprising:

means for including all network devices in the network as vertices.

13. An apparatus comprising:

means for identifying a set of convergence node network devices in a network including an interconnected group of network devices when a new link is added to the network between first and second selected network devices in the interconnected group of network devices to form a new network topology, with the new network topology having a plurality of equal cost paths connecting the source network device and a destination network device, where the set of convergence node network devices includes those network devices which in the new network topology are common to all equal cost paths between the source network device and the destination network device, where identifying comprises;

means for performing a modified shortest path first algorithm including all network devices in the network as vertices;

means for calculating a current test set of convergence nodes, for a next hop network device connected to a selected network device by a next hop link, where the next hop network device is closer to the destination network device than the selected network device, equal to the union of the test set of convergence node network devices for the selected network device and a next hop set including only the next hop network device if the path from the source network device to the next hop network device that includes the selected network device is the first equal cost path from the source network device to the selected next hop network device; or means for calculating a current test set of convergence nodes equal to the intersection of a previous test set of convergence nodes calculated for the next hop network device and the union of the test set of convergence nodes for the selected network device a next hop set including only the next hop network device if the path from the source network device to the next hop network device that includes the selected network device is not the first equal cost path from the source network device to the next hop network device;

means for identifying a critical convergence node network device which is closest to the second selected network device and positioned between the second selected network device and the destination network device by calculating the number of hops between each convergence node network device positioned between the second selected network device and the destination network device, where the critical convergence node network device is the convergence node network device having the least number of hops from the second selected network device; and means for flushing packets from the network only up to the critical convergence node when the new link is added to the network.

14. The apparatus of claim 11 wherein the means for calculating the number of hops to each convergence node network device comprises:

means for setting the number of hops, for a next hop network device connected to a selected network device by a next hop link, where the next hop network device is closer to the destination network device than the selected network device, equal to the maximum of either the number of hops of the selected network device incremented by one or a previously calculated number of hops to the next hop network device.

15. An apparatus comprising:

a network device configured to be coupled to a network as a source network device, with the network device including a memory and a processor, and with the network having a plurality of interconnected network devices coupled by links and with one of the network devices being a destination network device;

with the memory holding program code and configured to hold network topology information; and with the processor configured to execute program code to identify at least first and second convergence node network devices in a network including an interconnected group of network devices when a new link is added to the network between first and second selected network devices in the interconnected group of network devices to form a new network topology, with the new network topology having a plurality of equal cost paths coupling the source network device and a destination network device, where the first and second convergence node network devices are those network devices which are common to all equal cost paths in the new network topology between the source network device and the destination network device, to identify a critical convergence node network device which is closest to the second selected network device and positioned between the second selected network device and the destination network device and where the first and second convergence node network device are located between the source and destination devices and do not include the source and destination network devices, where the destination device is not convergence node, and to flush packets from the network only up to the critical convergence node network device when the new link is added to the network.

16. The apparatus of claim 15 with the processor further configured to execute program code to:
flush packets at the source network device by dropping packets for a selected time interval when the new link is added, where the time interval has a value equal to the sum of network device lifetimes for each network device, including the source network device, positioned between the source network device and the critical convergence node network device.

17. The apparatus of claim 15 with the processor further configured to execute program code to:
calculate the number of hops between each convergence node network device positioned between the second selected network device and the destination network device, where the critical convergence node network device is the convergence node network device having the least number of hops from the second selected network device.

18. The apparatus of claim 16 with the processor further configured to execute program code to:
perform a modified shortest path first algorithm to identify the set of convergence nodes to identify the convergence node network devices and determine which convergence node network device is closest to the source network device.

19. An apparatus comprising:
a network device configured to be coupled to a network as a source network device, with the network device including a memory and a processor, and with the network having a plurality of interconnected network devices coupled by links and with one of the network devices being a destination network device;
with the memory holding program code and configured to hold network topology information; and
with the processor configured to execute program code to identify a set of convergence node network devices in a network including an interconnected group of network devices when a new link is added to the network between first and second selected network devices in the interconnected group of network devices to form a new network topology, with the new network topology having a plurality of equal cost paths connecting the source network device and a destination network device, where the set of convergence node network devices includes those network devices which are common to all equal cost paths in the new network topology between the source network device and the destination network device, to identify a critical convergence node network device which is closest to the second selected network device and positioned between the second selected network device and the destination network device, and to flush packets from the network only up to the critical convergence node network device when the new link is added to the network, calculate the number of hops between each convergence node network device positioned between the second selected network device and the destination network device, where the critical convergence node network device is the convergence node network device having the least number of hops from the second selected network device; and with the processor further configured to:
for a next hop network device connected to a selected network device by a next hop link, where the next hop network device is closer to the destination network device than the selected network device:
calculate a current test set of convergence nodes equal to the union of the test set of convergence node network devices for the selected network device and a next hop set including only the next hop network device if the path from the source network device to the next hop network device that includes the selected network device is the first equal cost path from the source network device to the selected next hop network device; or
calculate a current test set of convergence nodes equal to the intersection of a previous test set of convergence nodes calculated for the next hop network device and the union of the test set of convergence nodes for the selected network device and a next hop set including only the next hop network device if the path from the source network device to the next hop network device that includes the selected network device is not the first equal cost path from the source network device to the next hop network device to identify the set of convergence node network devices.

20. The apparatus of claim 17 with the processor further configured to execute program code to:
for a next hop network device connected to a selected network device by a next hop link, where the next hop network device is closer to the destination network device than the selected network device:
set the number of hops equal to the maximum of either the number of hops of the selected network device incremented by one or a previously calculated number of hops to the next hop network device to determine the number of hops to each convergence node network device.

* * * * *